(12) United States Patent
Smith

(10) Patent No.: US 10,474,336 B2
(45) Date of Patent: Nov. 12, 2019

(54) PROVIDING A USER EXPERIENCE WITH VIRTUAL REALITY CONTENT AND USER-SELECTED, REAL WORLD OBJECTS

(71) Applicant: Adobe Inc., San Jose, CA (US)

(72) Inventor: Kevin Smith, Lehi, UT (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/385,792

(22) Filed: Dec. 20, 2016

(65) Prior Publication Data

US 2018/0173404 A1 Jun. 21, 2018

(51) Int. Cl.
| | | |
|---|---|---|
| *G06T 19/00* | (2011.01) | |
| *G06F 3/0484* | (2013.01) | |
| *G06F 3/01* | (2006.01) | |
| *G06F 3/0481* | (2013.01) | |

(52) U.S. Cl.
CPC .......... *G06F 3/04842* (2013.01); *G06F 3/011* (2013.01); *G06F 3/017* (2013.01); *G06F 3/04815* (2013.01); *G06T 19/006* (2013.01); *G06F 3/012* (2013.01)

(58) Field of Classification Search
CPC . G06T 19/006; G06T 19/003; G06T 2200/08; G06T 27/017; G06T 2027/0178; H04N 13/044

See application file for complete search history.

(56) References Cited

U.S. PATENT DOCUMENTS

| | | | | |
|---|---|---|---|---|
| 2007/0248341 A1* | 10/2007 | Larner | ..................... | G03B 7/00 396/52 |
| 2011/0102457 A1* | 5/2011 | Bhatt | ..................... | G06F 3/0481 345/619 |
| 2012/0121135 A1* | 5/2012 | Kotake | ................... | G01S 5/163 382/103 |
| 2013/0257899 A1* | 10/2013 | Baron | ................... | G06T 19/006 345/619 |
| 2014/0023341 A1* | 1/2014 | Wang | ....................... | H04N 9/87 386/240 |
| 2016/0225164 A1* | 8/2016 | Tomlin | .................... | G06T 15/04 |
| 2017/0019656 A1* | 1/2017 | Liu | ....................... | H04N 13/239 |
| 2017/0148090 A1* | 5/2017 | Davi | ..................... | G06Q 30/06 |

(Continued)

OTHER PUBLICATIONS

Holoportation: virtual 3D teleportation in real-time (Microsoft Research), retrieved from https://www.youtube.com/watch?v=7d59O6cfaM0, published on Mar. 25, 2016 (Year: 2016).*

*Primary Examiner* — Weiming He

(74) *Attorney, Agent, or Firm* — Kilpatrick Townsend & Stockton LLP

(57) ABSTRACT

Techniques disclosed herein provide a user experience with virtual reality content and user-selected, real world objects. An exemplary technique involves receiving input selecting a subset of the real world objects in a selection view. The subset of the real world objects is selected for inclusion in the user experience. The technique further involves identifying virtual reality content for inclusion in the user experience. The technique provides the user experience by combining a live view of the user's real world environment with the virtual reality content. The real world objects in the live view that are in the subset selected by the user are visible in the user experience. The real world objects in the live view that are not in the subset selected by the user are replaced with virtual reality content.

18 Claims, 8 Drawing Sheets

(56) References Cited

U.S. PATENT DOCUMENTS

2017/0316613 A1* 11/2017 Wright ................... G06T 19/006
2017/0337742 A1* 11/2017 Powderly ............. G02B 27/017
2018/0004283 A1*  1/2018 Mathey-Owens ...........................
                                                       G06F 3/04815

* cited by examiner

US 10,474,336 B2

PROVIDING A USER EXPERIENCE WITH VIRTUAL REALITY CONTENT AND USER-SELECTED, REAL WORLD OBJECTS

TECHNICAL FIELD

This disclosure relates generally to computer-implemented techniques and more particularly relates to improving the efficiency and effectiveness of computing systems used to provide virtual reality experiences, augmented reality experiences, and other user experiences.

BACKGROUND

Virtual reality (also referred to as "VR") techniques typically involve providing realistic images, sounds, and other sensations to simulate a three-dimensional virtual environment. Virtual reality techniques provide realistic and immersive simulations that are experienced or controlled by movements of the users' bodies. A user is typically able to move around in the virtual environment and interact with virtual objects that are displayed. For example, the user can reach out a hand to virtually touch and open a virtual filling cabinet in a virtual environment. Software used to provide virtual reality environments provides images of the virtual environment and changes those images based on the user's movements so that the user experiences the environment as if the user were in the environment. Electronic displays, projectors, virtual reality headsets (also referred to as head-mounted displays or HMDs), and various other devices are used to provide virtual reality experiences. HMDs typically take the form of head-mounted goggles with a screen in front of the eyes. A person using an HMD is typically able to look around the virtual environment by moving his head or turning his body. The person is also typically able to interact with features or items that are depicted in the virtual environment based on sensors on the HMD that detect movement of the person's body. HMDs also typically include speakers that play sounds of the virtual environment. HMD and other virtual reality devices also typically cut off outside stimuli, for example by preventing the user from seeing or hearing the real world. This focuses the user on the virtual environment and makes the virtual experience more realistic. Existing virtual reality techniques generally do not combine real world objects from user's local environment with virtual content.

Augmented reality (also referred to as "AR") techniques provide live, direct or indirect, views of real world environments with augmented or supplemented elements. The augmented content often includes computer-generated images, video, sounds, or other content. Augmented reality can be used to enhance a user's perception of reality, for example, by overlying information about real world objects in the user's environment. For example, a construction worker may wear an AR helmet that displays information about the construction site or project at which he is currently working.

Existing augmented reality techniques augment the real world with additional content in generic ways that generally fail to account for the user's needs and preferences or the actual characteristics of the real world environment. For example, instructions that are added as augmented content may be added in a fixed location (e.g., the lower left corner of a display) and thus in a particular circumstance end up blocking the user's view of important real world objects. Existing AR techniques thus often do not adequately combine real world and virtual content in ways that best suit the particular real world circumstances and the differing individual needs and preferences of users. As a result, the augmented content does not provide individual users with a desirable experience.

SUMMARY

Techniques disclosed herein provide a user experience that combines virtual reality content and user-selected, real world objects. An exemplary technique involves receiving input selecting a subset of the real world objects. The subset of the real world objects is selected for inclusion in the user experience. For example, the user can provide input to draw boundaries around an object from one or more viewing directions to identify the object for inclusion in the user experience. The technique further involves identifying virtual reality content for inclusion in the user experience. For example, the user can select a pre-recorded scene, a computer-generated scene, or a live feed from another location as the source of the virtual reality content. The technique provides the user experience by combining a live view of the user's real world environment with the virtual reality content. The real world objects in the live view that are in the subset selected by the user are visible in the user experience. The real world objects in the live view that are not in the subset selected by the user are replaced with virtual reality content.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
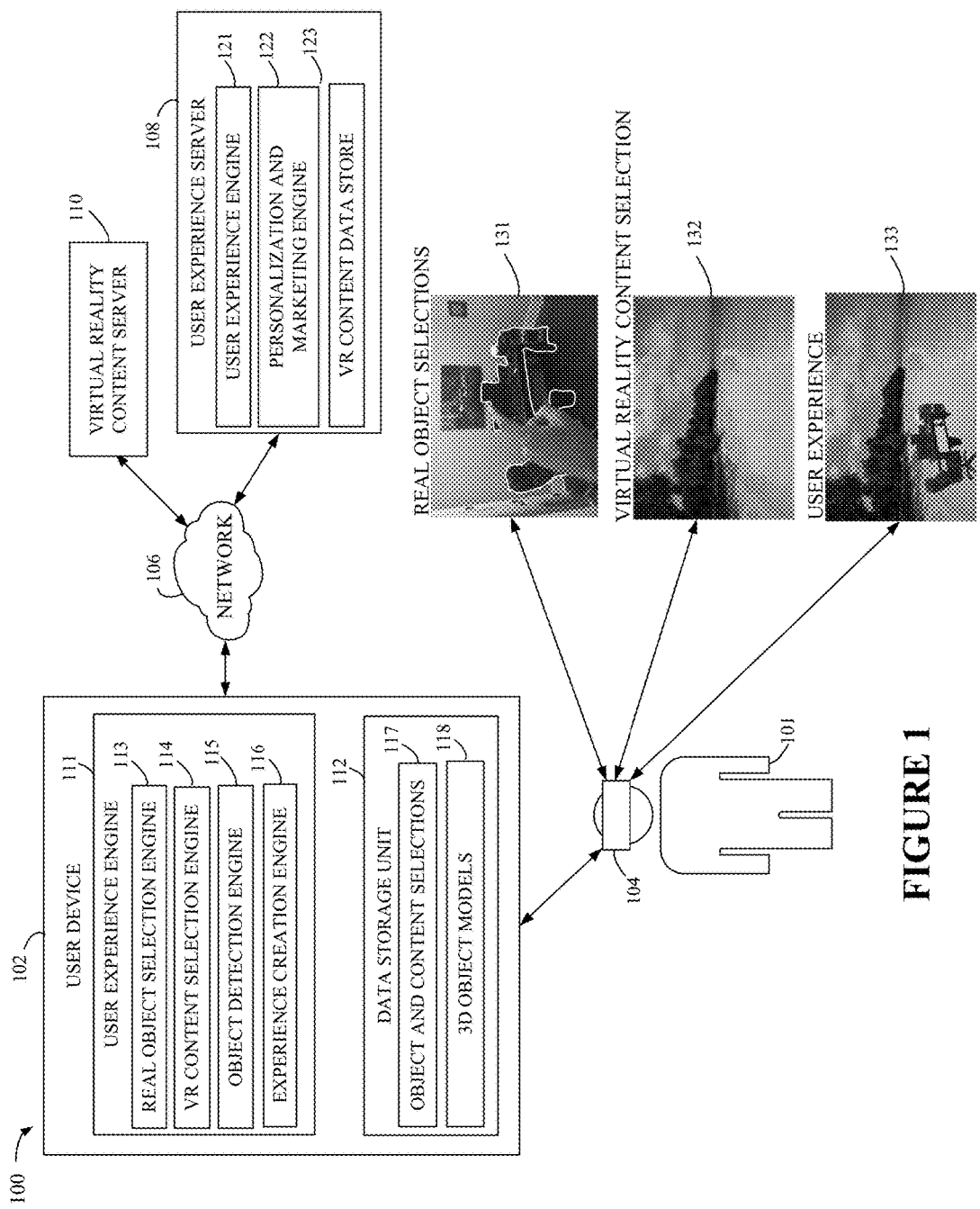
FIG. 1 is a diagram of an environment in which one or more techniques of the invention can be practiced.

As discussed above, existing virtual reality and augmented reality techniques do not provide environments that combine real world and virtual environment features in ways that fit a user's particular circumstances, preferences, and needs. Techniques of the invention enable a user to control the creation of a user experience that has objects from a real world environment and objects from an immersive, virtual environment. In one embodiment, the user provides input that selects real world objects that will be included in the user experience. For example, a user can create a user experience that combines real world objects that the user will use for work (e.g., his desk, desk, computer displays, keyboard, phone, and filling cabinets) but that replaces other portions of the real world environment with virtual content (e.g., aspects of a beach environment).

Once created, the user experiences the created user experience. The user sees the real world objects combined with the virtual content. The desk and other work objects appear to be on the beach rather than in a cubicle. The user can interact with the real world objects in the same ways the user normally interacts with real world objects, e.g., answering the phone, typing on the keyboard, etc. However, the user also experiences his surrounding based on the virtual environment. The user looks down and sees sand, looks beyond the edge of the desk and sees the beach and ocean, etc. The user can also selectively experience sounds (and other sensory input) from real and virtual sources. For example, the sound of a real world phone ringing can be included from the experience, the real world sounds of hallway conversations can be muted or reduced, and the virtual sounds of waves crashing and birds chirping can be provided.

The user experience can additionally be configured by the user to be responsive to detected events. The user may specify that the appearance or non-appearance of certain real world objects will be triggered by certain events. For example, the user can identify that a phone is only to be displayed when there is an incoming call. While experiencing the user experience, the phone is not displayed until an incoming call is detected, for example, based on detecting the sound of the phone ringing. In another example, the detection of real world movement can trigger the display of an object associated with the movement. For example, when another person walks into the user's cubicle, the movement of the other person can be detected and the other person included as one of the real world objects in the user experience.

Various techniques can be used to enable a user to select real world objects to be included in a user experience. In one example, an employee sitting in a cube in Chicago puts on an HMD and looks around her cubicle in real world object selection mode. The user sees the real world while in selection mode, i.e., the cubicle as it appears in real life. The user provides input selecting one or more of the real world objects. For example, she can select items such as her desk, chair, computer, telephone, garbage can, picture of her family, etc. These selections identify those real world objects as objects that will not be replaced in the created user experience. The user input selecting the objects can identify portions of a view of the cubicle from one or more different perspectives. In one example, the user moves a finger around in space in front of the HMD to draw boundaries around particular objects. As the user draws with her finger, virtual lines appear overlaying the view of the real world. In this example, based on the identified boundaries, the background software produces a 3D model of the objects in the room and then identifies the corresponding real world objects to be included based on the identified boundaries. The user may be prompted to repeat this process from different viewing perspectives, i.e., different locations in the cubicle, to ensure that the 3D model accurately represents the cubicle and to ensure that the selected real world objects will be identifiable from different view directions. In an alternative embodiment, the user first moves around the cubicle to allow the HDM to capture images from different angles. A 3D model is determined based on these images and an object detection algorithm is then used to identify objects and their boundaries in the room. The user is then able to view the room with boundaries of objects overlaying the real world objects and select the real world objects by pointing to, or otherwise providing input, to select each object.

Various techniques can be used to enable a user to select virtual content to be included in the user experience. In one example, after using an HMD to select real world objects to be included in the user experience, the mode of the device switches to a virtual content selection mode. In this mode, the user is provided with a list, carousel, menu, or other graphical user interface for viewing and selecting virtual content for the User experience. Input such as hand gestures can be recognized to allow the user to navigate through different virtual environments. In addition, to navigating through preselected or previously used virtual environment options, the user may be given the option to identify or find a virtual environment from another source location. In one example, a virtual environment is provided by a live feed, e.g., a webcam on a beach, in a daycare, etc., and the user identifies the network address from which the live feed can be obtained.

In another example, a user selects multiple virtual environments for inclusion in the user experience. For example, the user may select a beach virtual environment for one side of the cubicle and a live-stream from his child's daycare center for another side of the cubicle. Multiple virtual reality environments can be used in alternative ways in the user experience. For example, the user may select a time-based rotation of virtual environment content, e.g., 45 minutes of a beach environment, 10 minutes from a day-care feed, 5 minutes from home webcam feed, repeat.

In another example, a user provides input to orient a virtual environment relative to the real world objects that were selected for the user experience. For example, a user may provide a finger twisting or other input to rotate a virtual beach environment so that the ocean is directly in front of the real world desk rather than to the right side of the desk. Similarly, the user may control the relative position of real world object to aspects of the virtual environment. For example, the user could provide input to change the relative location of the real world desk and other objects to the ocean, e.g., preferring to be 10 feet from the water's edge rather than 50 feet from the water's edge.

Various techniques can be used to provide a user experience based on user-selected real-world objects and/or user-selected virtual environment content. In one example, an AR-VR headset captures an image of the real-world environment, detects the selected real world objects in the image, creates a composite image that replaces the other portions of the image with content from the selected virtual environment, and displays the User experience in the AR-VR headset. This process can be continually repeated so that the user effectively sees a live video stream of the selected real world object with other content replaced from the selected virtual environment. This exemplary process can be made more efficient by reducing the frequency of the object detection. For example, the process can be configured to only detect objects every few seconds or longer unless the AR-VR headset moves more than a threshold amount.

In one work desk/beach example, the user creates and activates the user experience and then suddenly she is sitting at her desk on the beach in Maui, Hi. She can still see her computer screen and her desk. She can answer the phone when it rings and type on her keyboard. However, when she looks at the floor, she sees sand. When she looks behind her computer, she sees the waves rolling onto the beach. As she turns around in a complete 360 she sees a beach in Maui except for where the selected real-world objects are displayed. She also hears the waves and the seagulls. She feels as if she were really working at her desk on the beach.

Techniques of the invention provide numerous advantageous over prior techniques. Certain techniques allow a user to selectively mix his current environment with a desired environment. Many of us do not get to live, work, or spend time in the places we most desire. A user may want to be sitting on the beach in Maui, Hi., but real world responsibilities dictate that the user spends most days sitting in a cubical in a skyscraper office in downtown Chicago. In this example, techniques of the invention allow the user to perform required real world tasks as if the user were in another environment—an environment of the user's choosing. This allows the user who is obliged to work in a cubical in Chicago to work as if he were sitting on a beach in Maui. As another example, it allows a college student who needs to draft a term paper or work out a complex mathematical proof in his dorm room to work as if in a quiet and inspiring mountain cabin. This user is able to escape from the visual, audio and other sensory distractions of his roommates and perhaps use the selected virtual surroundings to enhance his concentration or as a source of inspiration.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, head mounted displays (HMDs), desktop computers, laptop computers, server computers, tablets, telephones, mobile telephones, televisions, portable data assistant (PDA), e-readers, gaming devices, smart watches, cloud computing resources, virtual machines, etc.

As used herein, the phrase "head mounted display" and "HMD" refers to a display device, worn on the head or as part of a helmet, that has a small display optic in front of one or both eyes. A typical HMD has one or two small displays, with lenses and semi-transparent mirrors embedded in eyeglasses, a visor, or a helmet. The display units are typically miniaturized and may include cathode ray tubes, liquid crystal displays, liquid crystal on silicon, or organic light-emitting diodes. HMDs can display computer-generated imagery, live imagery from the real world, and/or a combination of the different content types. In one example, an HMD is configured with a camera and microphone to capture images and sounds of real world objects and provide a user experience that combines a selection of the real world objects with virtual content.

As used herein, the phrase "real world objects" refers to objects in the real world environment that a user can see, hear, smell, touch, and/or taste. Real world object can include natural and man-made objects. Examples of real world objects include, but are not limited to, desks, chairs, sofas, tables, furniture, floors, walls, ceilings, light fixtures, trash cans, televisions, monitors, computers, computing devices, appliances, plants, people, animals, and the any other physical objects in the real world.

As used herein, the phrase "a real world environment" includes the real world objects in a particular location. For example, a user's real world environment includes the real world objects around the user that the user can see, hear, smell, touch, and/or taste.

As used herein, the phrase "live view" refers to a view of a real world environment that is not pre-recorded. For example, a user experiences a live view when viewing his local real world environment through a partially reflective mirror to view at least some real world objects directly. In another example, a live view is provided by a computer device that receives video from a camera and displays that content to the user in real time or near real time. In one example, a live view is modified to include virtual reality content to provide a user experience based on user selection of which real world objects should (or should not) be replaced with virtual reality content.

As used herein, the phrase "virtual reality content" refers to any content real, computer-generated, or otherwise created that comes from a source other than a user's real world environment. Virtual content can include pre-recorded or live images and sounds of another real world environment outside of the user's own. For example, a user in an office building can experience virtual reality content from a beach, from inside the daycare next door, or from a camera in the user' home. Virtual reality content can also be a combination of content from different sources.

As used herein, the phrase "selection view" refers to one or more images of a real world environment viewed by a user to select one or more of the real world objects for a user experience.

As used herein, the phrase "user experience" refers to video, audio, and/or other sensory content provided to a user based on real world objects and/or virtual reality content. For example, a user experience can include augmented reality in which selected real world objects are combined with virtual reality content.

As used herein, the phrase "augmented reality" refers to displaying additional content on a real-world, live view. Combining a real-world view with other content can be done by projecting computer generated content, prerecorded content, or live content from another real world environment through a partially reflective mirror and viewing the real world directly. This method is referred to as optical see-through. Combining a real-world view with computer generated content can also be done electronically by accepting video from a camera and mixing it electronically with the other content.

Exemplary Computing Environments for Scaling Applications

FIG. 1 is a diagram of an environment 100 in which one or more embodiments of the present disclosure can be practiced. In the environment 100, a user 101 uses a user device 102 and a head mounted display (HMD) 104 to create and use a user experience that combines selected objects from the real world with virtual reality content. In the environment 100, the user device 102 provides a user experience engine 111 and stores data in a data storage unit 112 to enable the creation and use of the user experience. In an alternative implementation, a single device combines the features of the HMD 104 and the user device 102. For example, an HMD can be configured to include a user experience engine and data storage unit to enable the creation and use of the user experience without accesses a separate user device.

Examples of the user device 102 include, but are not limited to, a personal computer (PC), tablet computer, a desktop computer, a mobile computing device, a smart phone, a processing unit, any combination of these devices, or any other suitable device having one or more processors. The engines of user device 102 can be implemented by configuring one or more processors to execute stored instructions to perform the functions of the engines.

The user device includes a user experience engine 111. In this example, the user experience engine 111 includes engines 113-116 to enable the user 101 to create and use a user experience that combines selected real world objects with virtual reality content. The user experience engine 111 includes a real object selection engine 113, a virtual reality content selection engine 114, an object detection engine 115, and an experience creation engine 116. The real object selection engine 113 provides an interface for the user 101 to select which of the real world object in the user's real world environment will be included in the user experience. For example, the real object selection engine 113 can control a user's selection mode experience in which the user 101 views a live view of the user's real world environment using the HDM 104 and provides finger movements or other inputs to identify the objects to make the real world selections 131. The real object selection engine 113 in this example receives the live view and information about the user's selections, e.g., the relative movement paths of the user's finger relative to the real world objects that are displayed in the live view. In one example, the real object selection engine 113 creates 3D object models 118 based on the live feed and/or the user's input identifying real object boundaries. The user selections of real world objects are stored in the object and content selections 117.

The virtual reality content selection engine 114 provides an interface for a user to select virtual reality content to be included in the user experience. In the environment 100, the user device provides various virtual reality content options that are displayed on the HMD 104 to the user 101. The user 101 makes virtual reality content selection 132 to select the virtual reality content that will be included in the user experience. The interface may provide sample video clips or sample live feeds from other real world locations, such as from a virtual reality content server 110 that provides a live feed from another location. The user can view the various options from the different sources and locations and select one or more of the virtual reality content items for inclusion in the user experience. In one example, a user is able to select multiple sources for virtual reality content to be included in the user experience. In this example, virtual content selection engine 114 prompts the user for additional input to identify how the virtual reality content from the different sources should be used in the user experience. The user, for example, may identify one source to provide virtual reality content to replace a particular wall, a second source to provide virtual reality content to replace a window on another wall, etc. In another example, the user specifies a time schedule for alternating amongst virtual reality content from different sources, e.g., alternating between sources every 30 minutes. The user selections of virtual reality content are stored in the object and content selections 118.

The object detection engine 115 and experience creation engine 116 provide the user experience. The following example illustrates one technique for using the object detection engine 115 and experience creation engine 116 to provide a user experience that combines selected real world objects and virtual reality content. The HMD 104 captures a live view that is provided to the object detection engine 115. The object detection engine 115 uses the 3D object models 118 to detect the real world objects corresponding to the real object selections 131 in each frame of the live view that should not be replaced. The experience creation engine 116 modifies the live view by replacing the other objects in each of the frames with virtual reality content based on the user's virtual reality content selection 132. The experience creation engine 116 then provides the modified live feed, including the virtual reality content, in real time for display to the user on user device 102A. In this way, the user experiences a user experience 133 that combines a live view of selected real world objects with the selected virtual reality content.

The data storage unit 112 include assets that are used to facilitate the creation and use of a user experience that combines user-selected real world objects with virtual reality content. These assets include object and content selections 117 and 3D object models 118 that facilitate these functions. The object and content selections 117 store the user's selections of which real world objects should or should not be included in the user experience, such as real object selections 131. The object and content selections 117 also store the user's selections of which virtual reality content should be included in the user experience, such as virtual reality content selection 132. The 3D object models 118 store models of the real world objects that will be included and/or excluded from the user experience. The 3D object models 118 are used in one embodiment to identify the real world objects that will be replaced and/or not replaced in a live view of a real world environment.

The creation and use of a user experience that combines selected real world objects with virtual reality content can be implemented locally using one or more user devices, such as user devices 102, 104. The environment 101 also includes one or more resources that can be accessed via a network 106 in certain embodiments of the invention to facilitate or enhance the creation and use of such a user experience. Examples of the network 106 include, but are not limited to, Internet, local area network (LAN), wireless area network, wired area network, wide area network, personal area network (PAN), and the like.

User experience server 108 includes a user experience engine 121, a personalization and marketing engine 122, and a virtual reality content data store 123. The user experience engine 121 is remotely configured to provide functions similar to the functions provided by one or more of the engines 113-116 of the user experience engine 111 on the user device 102. The functions of a user experience engine can be provided locally using user experience engine 111, remotely using user experience engine 121, or using a combination of local and remote engines. In one example, one or more of the functions of virtual reality content engine 114 are implemented remotely using the user experience engine 121 of the user experience serve 108. The user experience engine can provide virtual reality content from the virtual reality content data store 123 to the user device 102 or HMD 104 for the user 101 to make the virtual reality content selection 132 for the user experience 133. The virtual reality content data store 123 can include a large repository of frequently updated virtual reality content.

The personalization and marketing engine 122 uses user data to personalize and enhance the process of creating and using a user experience that combines selected real world objects with virtual reality content. The user data can include data that is directly provided by the user, data from tracking the user, and/or data from other sources. Various methods of tracking the user to create user data can be used. For example, a tracking code can be embedded into the virtual reality content that is used by a user. When the user uses the virtual content locally in a user experience, a message with the tracking code can be sent to the personalization and marketing engine 122 so that the event can be tracked. The user data can include data about a user's prior real world object selections and virtual reality content selections. Such data can be used to provide suggestions to the user to create new user experiences or modify an existing user experience. The personalization and marketing engine 122 can also send advertisements and other marketing content to the user. Such marketing content can be based on information about the user. For example, based on the user selecting a beach scene as virtual reality content for a user experience, an advertisement for a beach vacation can be provided to the user. Marketing content can be provided separately from the user experience or provided as part of the user experience. For example, the user experience may show real world objects in a virtual reality beach scene and display a small advertisement in the corner for a beach vacation offer.

It is to be appreciated that the engines and working of the engines are described as examples herein and the engines can be used in alternative ways to suit a particular implementation.

Exemplary Techniques for Providing a User Experience

Embodiments of the invention provide techniques, systems, and computer-readable mediums with stored instructions that enable a user experience with virtual reality content and user-selected, real world objects. The functions involved in these embodiments of the invention generally involve identifying real world objects in a real world environment for inclusion in the user experience based on user input, identifying virtual reality content for inclusion in the user experience, and providing the user experience that combines the real world objects with the virtual reality content. These functions are generally implemented on one or more computing devices that use one or more processors to execute algorithms of one or more operations defined in stored instructions. The operations of various exemplary algorithms that can be employed to perform these functions are discussed in the FIGURES and throughout this specification.

Figure 2:
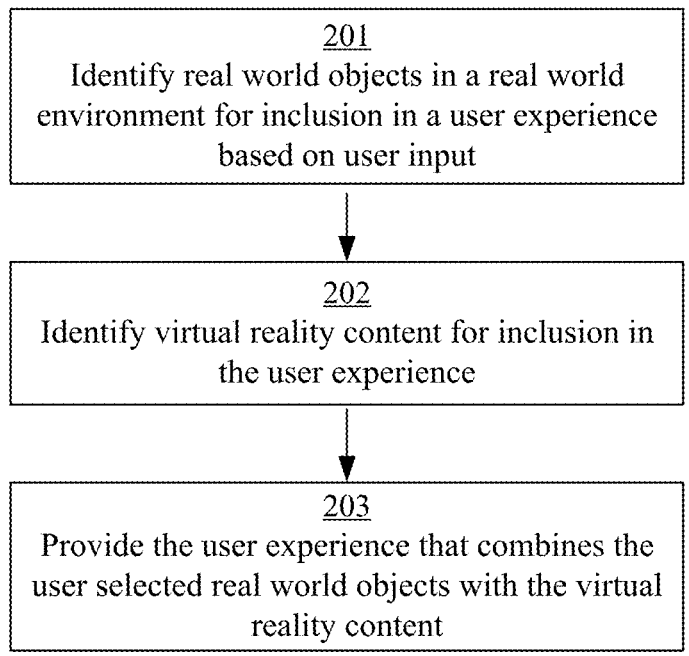
FIG. 2 is a flow chart illustrating an exemplary technique for providing a user experience with virtual reality content and user-selected real world objects.

FIG. 2 is a flow chart illustrating an exemplary technique 200 for providing a user experience with virtual reality content and user-selected real world objects. The exemplary technique 200 can be implemented using user devices and/or servers, such as user device 102A and creative apparatus 108 of FIG. 1, although other devices and configurations can also be implemented. The exemplary technique 200 can be implemented by storing and executing instructions in a non-transitory computer-readable medium.

Technique 200 involves identifying real world objects in a real world environment for inclusion in a user experience based on user input, as shown in block 201. The user input can identify such objects in various ways. In one embodiment, the user selects from a text-based list of items. For example, a user may select "desk," "chair," and "electronic devices," etc. without selecting "walls," "windows," "ceiling," etc. Based on the selected and unselected object names, one or more images of the real world environment are analyzed using an object detection technique to distinguish real world objects selected for inclusion from the other real world objects.

Figure 3:
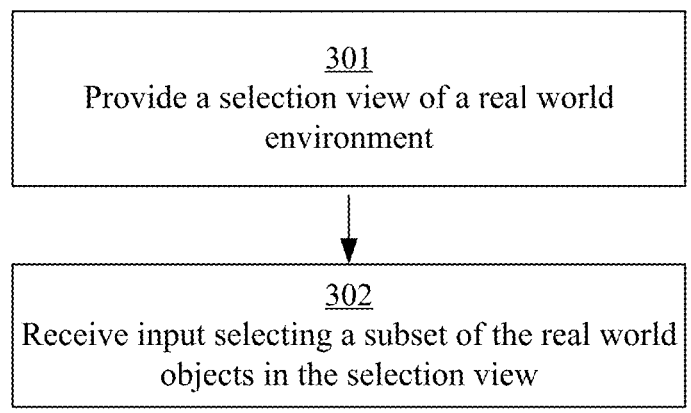
FIG. 3 is a flow chart illustrating an exemplary technique for user selection of real world objects.

FIG. 3 is a flow chart illustrating another exemplary technique 300 for user selection of real world objects. The exemplary technique 300 can be implemented using user devices and/or servers, such as user device 102A and creative apparatus 108 of FIG. 1, although other devices and configurations can also be implemented. The exemplary technique 300 can be implemented by storing and executing instructions in a non-transitory computer-readable medium. The technique 300 involves providing a selection view of a real world environment, as shown in block 301. The selection view provides one or more images of a real world environment for the user to view and use to make selections of one or more of the real world objects for a user experience. In one example, a user looks at a selection view using a head mounted display. The user wears the head mounted display and views a live view of the user's real world environment, which is displayed based on images that are captured by a camera on the head mounted display.

Technique 300 further involves receiving input selecting a subset of the real world objects in the selection view, as shown in block 302. In one example, this involves the user identifying objects by identifying the boundaries of the object from the user's viewing perspective. If using a head mounted display, for example, the user can trace the outline of the portions of images seen by the user using a finger. In another example, the user identifies the boundaries using a laser pointer to outline the objects while one or more cameras capture images of the objects. In another example, an automated detection algorithm creates a 3D model of the real world environment and the user selects real world objects to include by simply selecting a position on an image of the room. For example, by tapping on an image of a trash can or positioning a finger over the middle of the trash can for more than a threshold amount of time, the trashcan is selected. In these examples, the technique identifies one or more real world object in the 3D model based on such selections and displays an indication, such as borders around the objects, to indicate to the user the real world objects that the user has selected. The user can then confirm the selections, add new selections, delete prior selections, modify prior selections, modify the individual boundaries of prior selections, etc. In yet another example, a user draws circles or other shapes roughly around objects in the image and an automatic object detection technique is used to identify one or more objects and the associated boundaries, shapes, etc. within each user-specified shape. These techniques generally allow the user to quickly and easily identify the real world objects to be included.

Returning to FIG. 2, after identifying the real world objects for inclusion in the user experience based on user input, the technique 200 identifies virtual reality content for inclusion in the user experience, as shown in block 202. For example, this may involve providing an input interface that displays sample video clips or sample live feeds from other real world locations that the user can select for inclusion in the user experience. In one example, a user is able to select multiple sources for virtual reality content to be included in the user experience. The user is then prompted to provide input specifying how the virtual reality content will be used. As examples, the user may specify how virtual reality content from multiple sources will be combined, events that will trigger modifying or pausing the virtual reality content, a time schedule for the virtual reality content, and other preferences that specify how the user experience will include the selected real world objects and the virtual reality content.

Technique 200 further involves providing the user experience that combines the user-selected real world objects with the virtual reality content, as shown in block 203. In one embodiment of the invention, this involves identifying the real world objects and/or real world sounds and other sensory sources in a live feed from the real world environment. Real world objects and content from other sensory sources such as audio are replaced with virtual reality content. In one embodiment, the selected real world objects are viewed directly. For example, the user may view the real world objects through a glass portion of a head mounted display. At the same time, virtual reality content is displayed in the glass of the head mounted display to prevent the user from viewing the other (non-selected) real world objects. Instead, the user views the virtual reality content that is displayed in place of the other (non-selected) real world objects.

Figure 4:
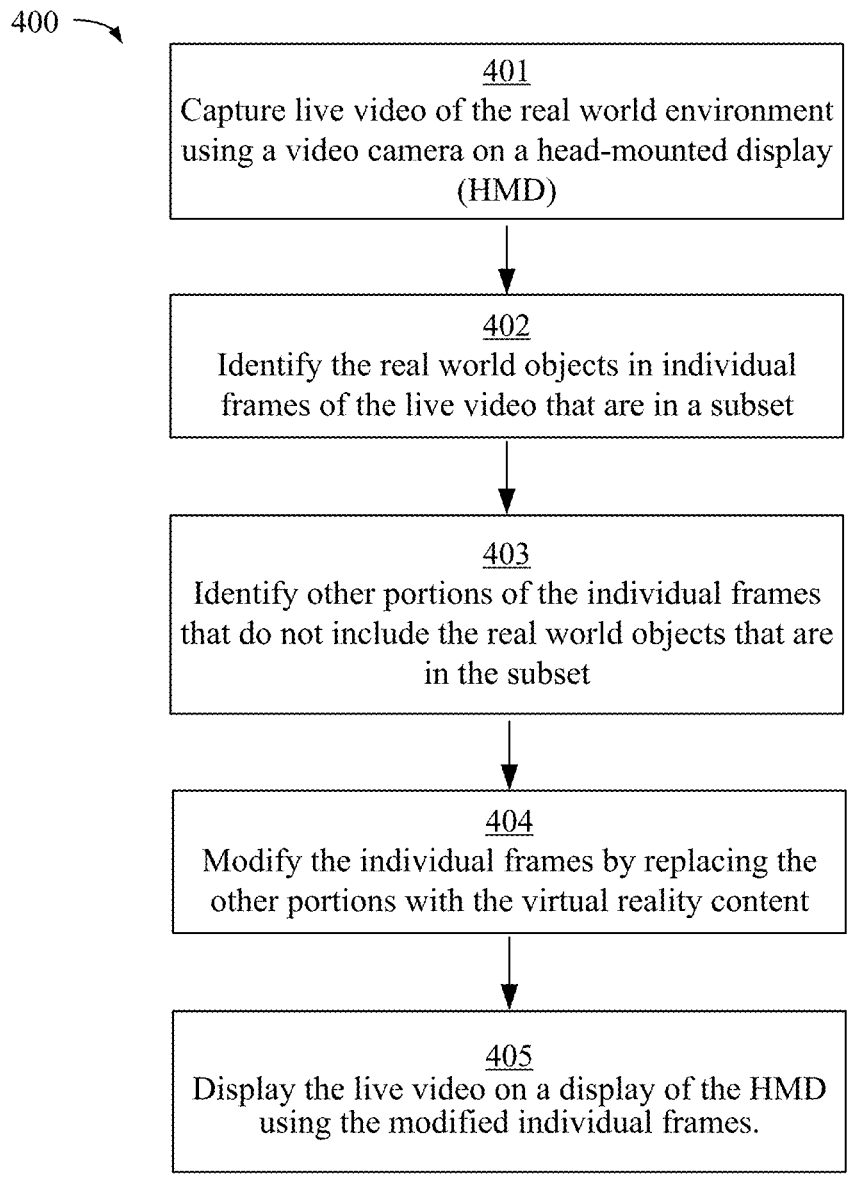
FIG. 4 is a flow chart illustrating an exemplary technique for providing a user experience with virtual reality content and real world objects from a live feed using a head mounted display.

FIG. 4 is a flow chart illustrating an exemplary technique 400 for providing a user experience with virtual reality content and real world objects from a live feed using a head mounted display. The exemplary technique 300 can be implemented using user devices and/or servers, such as user device 102A and creative apparatus 108 of FIG. 1, although other devices and configurations can also be implemented. The exemplary technique 300 can be implemented by storing and executing instructions in a non-transitory computer-readable medium. The technique 400 involves capturing live video of the real world environment using a video camera on a head-mounted display, as shown in block 401. The camera is positioned on the head mounted display so that the live view captured by the camera changes as the user moves his body and head. For example, the live view changes if the user rotates his head to the left or moves backwards two steps.

Technique 400 further involves identifying real world objects in individual frames of the live video that are in a subset of real world objects selected by the user, as shown in block 402. In one example, an algorithm is executed to analyze each frame of the live view to identify objects within each frame. Such an algorithm can use information about each of the objects in the subset. For example, based on a user identifying that a chair should be included in the user experience, the algorithm can perform image detection to identify whether the live view has any objects that match the characteristics (e.g., size, shape, etc.) of the chair selected by the user. In one embodiment, the object detection involves the use of a 3D model of the real world environment and/or the real world objects in the environment. This allows the real world objects in the live view to be identified from different perspectives. For example, a 3D model of a chair can be created based on images of the chair captured by the user viewing the chair using a HDM to view and select the chair from different viewing directions, using an HDM that has multiple cameras, or using a 3D model generation technique that determines a model of an object from a single image or viewing direction. The 3D model of the chair or other object can then be used to identify the chair in the live view frames and ensure that the chair is not replaced with virtual reality content. Thus, the 3D models can facilitate the identification of user-selected objects in a live view of a real world environment. In other embodiments, real world objects are identified without 3D models. For example, an object detection algorithm can simply analyze each frame and identify the objects based on the information in the frame.

One embodiment of the invention identifies the real world objects in frames of the live feed by keeping track of the real world objects from one frame the next in the live feed. This can involve detecting whether the camera used to provide the live feed is moved, for example, using one or more gyroscopes and/or other sensors. If the live feed camera remains in a constant position, one technique assumes that a chair or other object remains in the same position from one frame to the next unless differences in the appearance of the frames suggest otherwise. In one example, a live feed begins during a selection process in which a user selects real world object to be included in the user experience. The live feed continues from the selection process to the user experience, continuing to capture images (i.e., frames) of the live feed. Thus, the portion of a live feed that correspond to the chair during the selection process are assumed to be the chair as the user enters the user experience that replaces non-selected real world objects with virtual reality content.

Similarly, movement of the camera can be used to identify the selected real world objects in the live feed frames. As the user, rotates the camera (e.g., by turning his head while moving an HDM) or mores the camera (e.g., by walking around the real world environment), information about the camera position is used to identify the selected real world objects. For example, the chair can be identified when the user viewing the chair, turns around so that the chair is outside of the current view, and then turns back around again so that the chair is again in the current view. In this example, the technique determines based on the rotations of the camera that the chair will be visible again in an approximate position and uses this information about the likely position of the chair to identify the chair.

In one example, a 3D model of a real world environment is created and the technique keeps track of the camera relative to the real world objects in a 3D model. Thus, the technique can use assumptions based on the 3D model to identify real world objects in a live feed. For example, the technique can determine that when the camera (e.g., the user with an HMD on) is in a particular location facing a particular direction, a chair, desk, and computer monitor should be visible. In contrast, the technique can determine that in another camera location and/or direction a white board mounted on the wall should be visible. The determinations can be used to automatically display portions of the live feed corresponding the locations of the expected objects. In another example, the determinations are used as a starting point or input to an algorithm that confirms the determinations by performing object detection using the image characteristics of the frames of the live feed.

Technique 400 further involves identifying the other portions of the individual frames that do not include the real world objects that are in the subset, as shown in block 403. In one example, this involves automatically identifying the pixels of each frame of the live feed that are not pixels of the user-selected real world objects.

Technique 400 further involves modifying the individual frames by replacing the other portions with the virtual reality content, as shown in block 404. In one embodiment, this involves replacing pixels of all portions of each frame that are not part of a user-selected real world object with virtual reality content. In one example, virtual reality content for an entire frame is used as a starting point and the user-selected real world objects are displayed over top. The result is that user-selected real world objects and some portions of the virtual reality content are displayed in each frame, effectively replacing the other portions of the live feed with virtual reality content.

Technique 400 further involves displaying the live video on a display of the HMD using the modified individual frames of the live feed, as shown in block 405. This provides a user experience that combines the user-selected real world objects with virtual reality content. The user experience can be provided using the HDM so that the user's perception of other visual stimuli is reduced or blocked to make the experience more immersive. The user experience can additionally involve audio and other sensory content from either or both of the real world environment or the virtual reality content. For example, the user experience may allow the user the hear the real world phone when it rings but also hear the sounds of waves crashing in the virtual reality content. For example, a HMD can cover the user ears and produce audio content that combines some real world sounds (based on user preferences, selections, etc.) with sounds from the virtual reality content.

Figure 5:
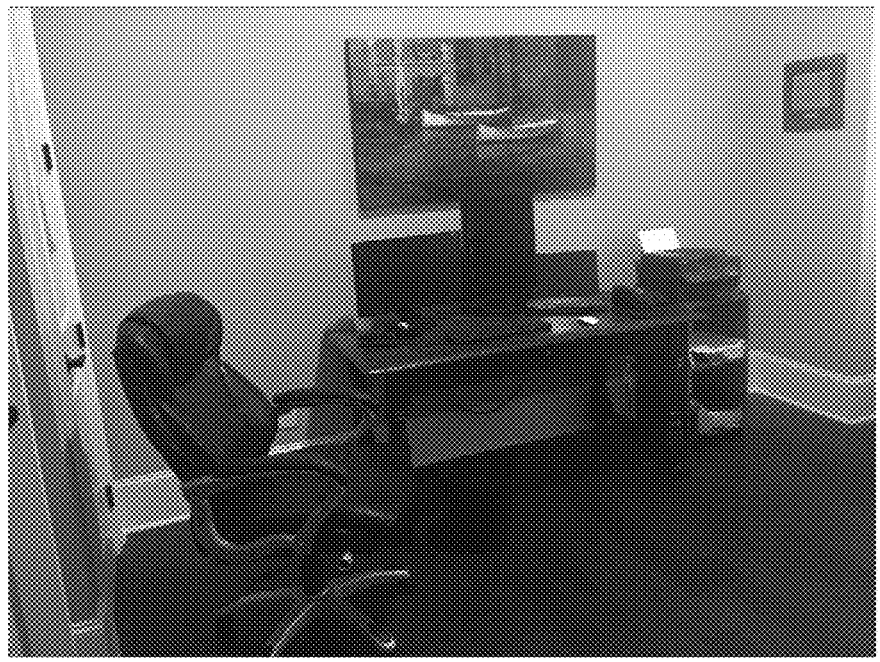
FIG. 5 depicts a selection view of a real world environment.
Figure 6:
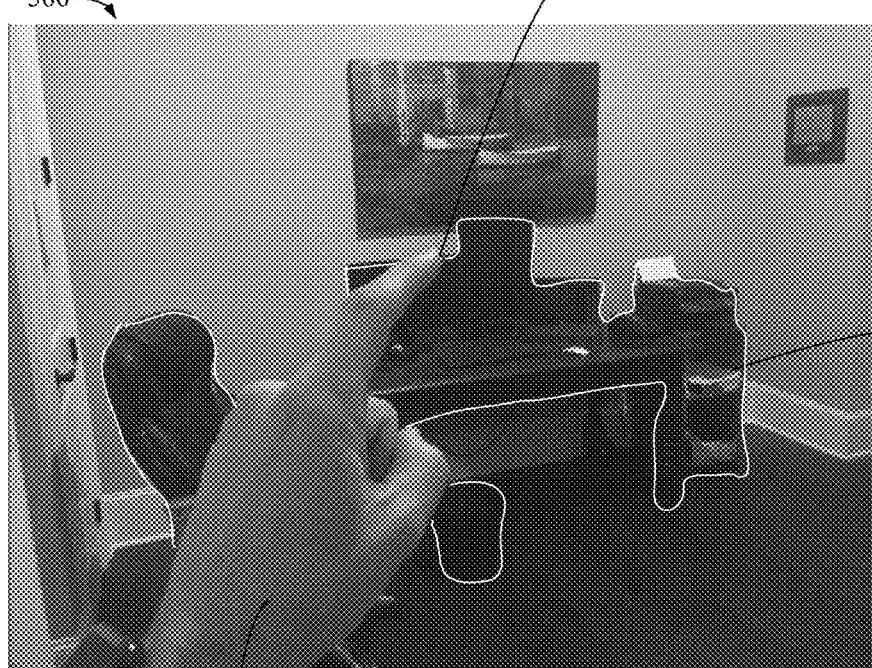
FIG. 6 depicts tracking of user finger movements in the selection view of the real world environment of FIG. 5 to identify the boundaries of real world objects.

FIGS. 5-8 depict an example of creating and using a user experience that combines user-selected real world objects with virtual reality content. FIG. 5 depicts a selection view 500 of a real world environment. For example, the user can see such a selection view 500 by putting on a head mounted display (HMD) with a camera and providing input to place the device into selection mode. Once the user has entered the selection mode, the user is able to provide input to select one or more of the real world objects to be included in the user experience FIG. 6 depicts tracking of user finger movements in the selection view 500 of the real world environment of FIG. 5 to identify the boundaries of real world objects. For example, the user could hold an extended finger 601 of a hand 602 still in a particular position for at least a predetermined amount of time, e.g., 3 seconds. The HDM or other device detects the hand 602 and the extended finger 601 being held steady for more than the threshold amount of time. Based on this, the device begins to track the movement of the extended finger 601 until a condition is satisfied. For example, the device can track the finger until a movement path 603 formed by the extended finger with respect to the real world environment in the live view reconnects with itself, i.e., to complete an enclosure. Thus, each time the user surrounds an object using a finger movement, the movement is interpreted by the device as a user identification of one or more objects within the boundaries define by the movement. Other conditions, such as the user retracting the extended finger 601 or holding the extended finger steady for more than a predetermined amount of time can be used as input identifying the completion of the real world object identification. In alternative embodiments of the invention, a live view of the real world environment is displayed on a display device such as a mobile device, tablet, laptop, or desktop monitor and the user uses touch input on a display screen with a finger or pen or uses mouse input to draw a boundary around one or more objects. In yet another embodiment of the invention, an algorithm automatically detects objects in one or more frames of a live view and the user selects real world objects to include simply by using a finger to point to an object or other input to simply identify on of the already identified objects. Similarly, the user may provide input to adjust an already identified boundary of an object. For example, dragging a boundary line to a new location so that more will be included or excluded from the real world objects selected to be included in the user experience.

Figure 7:
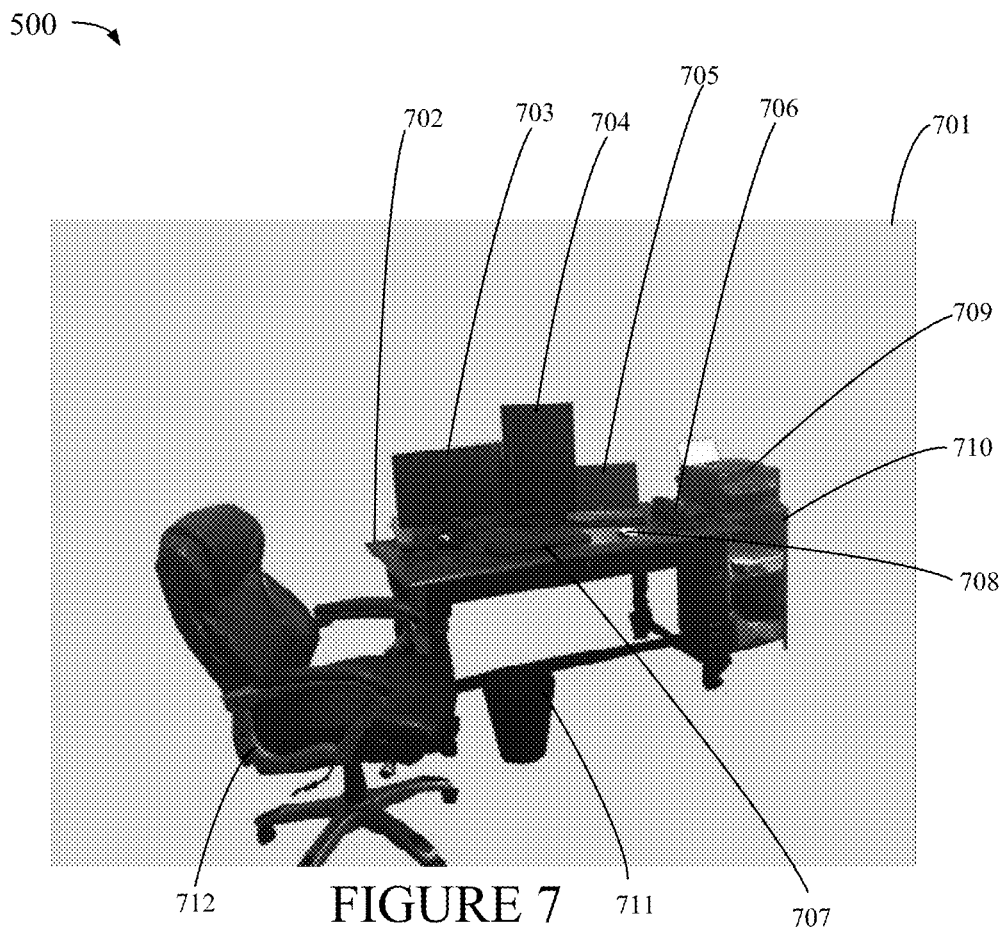
FIG. 7 depicts the selection view of the real world environment of FIGS. 5 and 6 that includes the selected real world objects and a solid background replacing the other real world objects.

FIG. 7 depicts the selection view 500 of the real world environment of FIGS. 5 and 6 that includes the selected real world objects and a solid background 701 replacing the other real world objects. In this example the user has previously selected real world objects for inclusion using the interface of FIGS. 5 and 6. The user-selected real world objects include desk 702, monitors 703, 704, laptop 705, phone 706, keyboard 707, mouse 708, printer 709, shelf 710, trash can 711, and chair 712. Note that certain real world objects can include a combination of other objects. In this example, the desk 702 includes the physical desk surface, the legs of the desk, and any objects on the surface of the desk. Thus, each real world object can have a boundary associated with it such that any other real world objects within that boundary (from the perspective of the user experience) will also be included in the user experience. A selection view 500 with a solid background as shown in FIG. 7 can be displayed to the user to allow the user to confirm that the real world objects that were selected are the real world objects that the user wants to include in the user experience.

Figure 8:
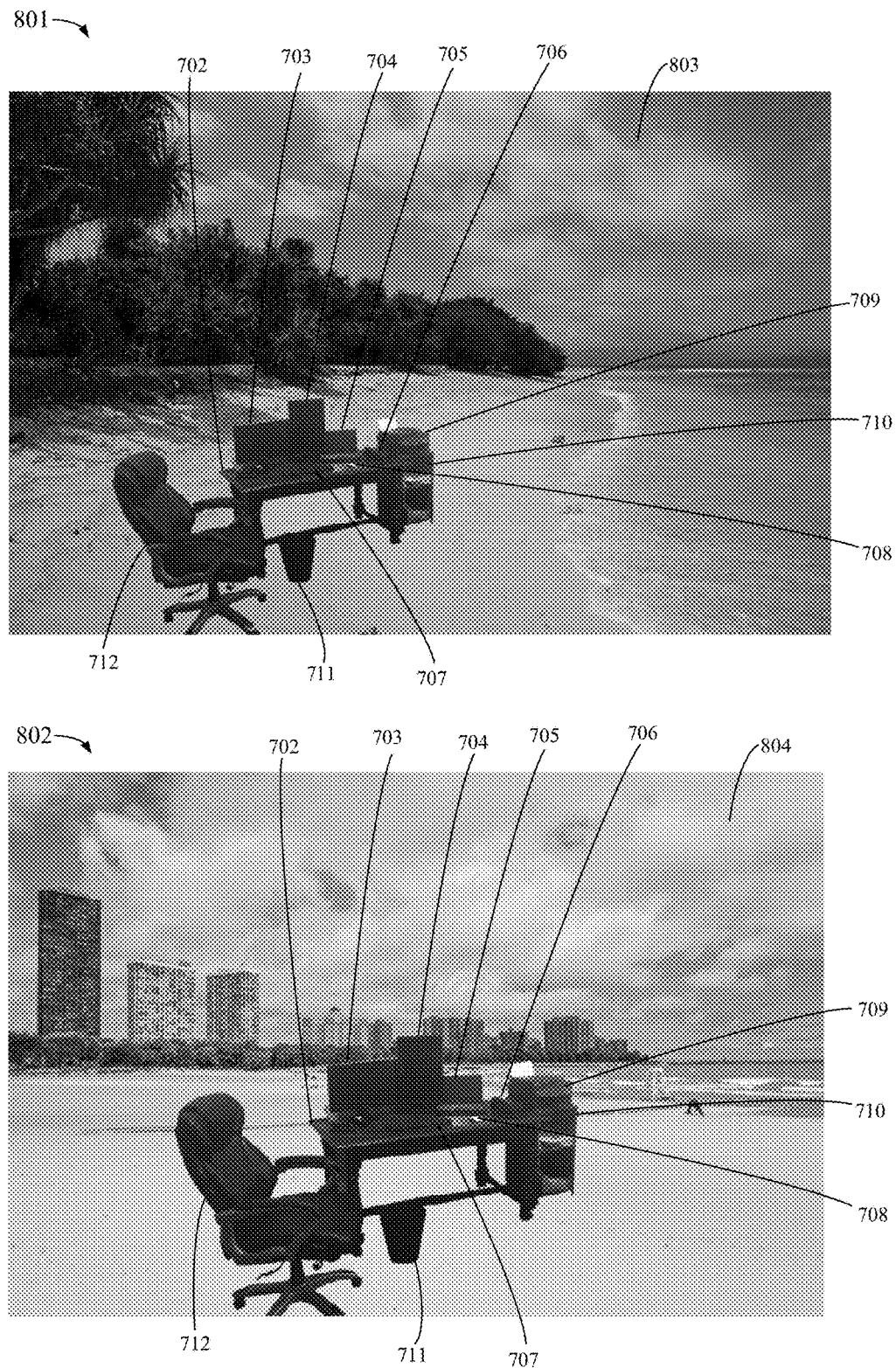
FIG. 8 depicts user experiences based on the selection of real world objects using the selection view of FIGS. 5-7 with different virtual reality content.

FIG. 8 depicts alternative user experiences based on the selection of real world objects using the selection view of FIGS. 5-7. In the first user experience 801, the user-selected real world objects, including the desk 702, monitors 703, 704, laptop 705, phone 706, keyboard 707, mouse 708, printer 709, shelf 710, trash can 711, and chair 712, are visible. However, the other portions of the live view are replaced with virtual reality content 803. As the user moves around and otherwise changes his live view, the user experience responds. For example, if the user looks down, he sees sand beneath his toes. If he looks up, he sees the clouds above. In the second user experience 802, the user-selected real world objects, including the desk 702, monitors 703, 704, laptop 705, phone 706, keyboard 707, mouse 708, printer 709, shelf 710, trash can 711, and chair 712, are also visible. However, the other portions of the live view are replaced with different virtual reality content 804. In one embodiment, the user previews various user experiences before initiating the user experience. In such a preview, the user can navigate through or be automatically shown a sequence of potential user experiences using different virtual reality content. In on example, the user navigates through such a preview by providing a swiping hand gesture or other input to change the preview from one user experience to the next.

Various other features can additionally or alternatively be used to facilitate the creation, control, and use of user experiences that include user-selected real world objects with virtual reality content. In one embodiment, only user-selected real world objects are replaced with virtual content. For example, a user could select to replace a real window overlooking a parking lot with a virtual reality view of a remote beach. In this example, the user simply identifies the rectangular shape of the window to identify the real world content that is to be replaced.

Embodiments of the invention allow a user to see his own body, clothing, and other items held or used by the user. In one embodiment, all real people and/or animals are automatically detected and displayed. Such people, animals, and associated real world objects such as clothing can be selected by the user expressly for example by the user capturing images of himself. In another embodiment, the user's and other users' bodies, clothes, and other real world objects are learned. For example, an object that moves in a live view of a real world environment can be treated as a user-selected real world object that is displayed as part of the user experience. The user can later choose to exclude one or more automatically identified objects to suit his or her particular preferences.

Embodiments of the invention can additionally or alternatively use interactive and productivity content in the virtual reality content. For example, a user may choose to replace a painted wall in his office with six virtual monitors that display actual computing content from a real world computer device that the user is using. The computing device provides some or all of its output to the HDM so that the output can be included as part of the virtual reality content. Similarly, the user could virtually replicate an entire workspace in another location. For example, a user in an airport could replace the real world airport cubical with a virtual reality content that includes the user's actual workspace in the office building across town, with three screens, a keyboard, etc.

Embodiments of the invention can also facilitate interactions with colleagues in remote locations. For example, a user can create a user experience that replaces one wall of his cubicle with a virtual door to a co-worker's cubicle across the country. When the user virtually interacts with the door, for example, by knocking or saying the co-workers name, the user device establishes a connection with the co-worker for a video conference, telephone call, etc. In one example, the co-worker is also in a user experience and both of the users' experiences are combined to simulate a face-to-face interaction. For example, one co-worker can knock on the virtual door of the other. When the second co-worker opens the virtual door, the two user experiences can be merged so that the users are able to look at each other through the opened virtual door. Each co-worker becomes part of the other's virtual reality content to facilitate the interaction. At the same time, each of the co-workers can also have access to his own user-selected real world objects. In this way, the users can experience an interaction that is very similar to a real interaction between co-workers in neighboring cubicles in the real world.

The devices used to provide a user experience that combines user-selected real world objects with virtual reality content can include various devices and components to enhance the user experience. Microphones, gyroscopes, speakers, displays, scent producing devices, scent detecting devices, light detecting devices, light producing devices, time tracking devices, geolocation tracking devices, humidity tracking devices, and various other forms of sensors and content producing devices can be used to enhance the user experience. One or more of these devices can be used to detect user input and/or events that facilitate the selection, control, and use of the virtual environment.

Embodiments of the invention use events to change a user experience. Certain embodiments allow a user to configure a user experience to respond to events based on the user's preferences. For example, a user turning his head to one side can be used as user input indicating a user instruction to turn off the user experience. Detected sounds can similarly trigger changes to the user experience. For example, a real world phone may only be visible when it rings and during a call. The user experience may pause, mute, or otherwise restrict the virtual content based on a doorbell ringing, a phone ringing, another user's voice being detected with more than threshold volume level. The detected light level in the room or the time of day can trigger changes in the virtual environment. For example, as the actual time of day approaches sunset, the virtual reality content can change to display a sunset over the beach. In one embodiment of the invention, the user specifies rules that determine how the user experience will respond to particular events. In another embodiment, the device learns by tracking how the user responds to particular detected events to identify patterns and establish automatic event-based changes to the user experience according to the detected patterns. For example, a user can reuse a created user experience day after day. Over time, the device can track that the user always responds to a doorbell ring by turning off the user experience. Based on this, the device creates a rule to automatically turn of the user experience when a doorbell ring is detected.

In another embodiment of the invention, the user experience changes based on sensing biometric information about the user, such as the user's body temperature, eye dilation, pulse, posture, etc. Such information can be indicative of a user's mood. In one example, if biometric conditions indicate that the user is under significant stress by satisfying predetermined criteria, the virtual reality content can be automatically altered to help the user respond to that stress. For example, the user experience may switch the virtual reality content to a more peaceful setting.

The user experience can include and respond to both real world and virtual reality events. For example, a user can create a user experience that combines a real world stationary exercise bike with a virtual environment of a bike race competition in France. As the user encounters hills in the virtual reality content, the settings on the real world bike can be automatically changed to simulate biking up the hills. For example, the user experience device can send a wired or wireless communication to the device to adjust the setting. In this example, user experiences could be combined to allow two users to simulate biking against one another in the bike race in France. The respective users are real world objects in each other's user experiences while the users share the same virtual reality content.

A user experience can be provided based on detecting new real world objects to be included in the user experience. For example, a package that is delivered to a user's real world inbox can be detected and displayed automatically based on it being new. New objects can be detected based on detecting movement, detecting changes to frames of a live feed (e.g., changes to the color in a room), based on detecting that a previously detected object is no longer visible, perhaps because it is obscured by a new object, or using any other appropriate new object detection technique.

The user experience can additionally or alternatively involve real world objects that are interconnected, for example, via the Internet of things (IoT). For example, a user's office phone may be connected to a user's HMD so the user can answer a call using the HMD rather than the phone. During the real world object selection process, objects can communicate with the HMD or other device being used to receive the user's selections. For example, a user's HMD can capture an image of a real world environment and then identify a keyboard, two monitors, and phone in the image based on receiving location information from these respective devices. Similarly, clothes and other physical objects can include RFID tags or other communication components that communicate with the HMD to provide information about the identity, geometry, size, interaction capabilities, and other characteristics of the objects in the room. Such identifications can make the user-selection of objects more efficient as well as more accurate.

Figure 9:
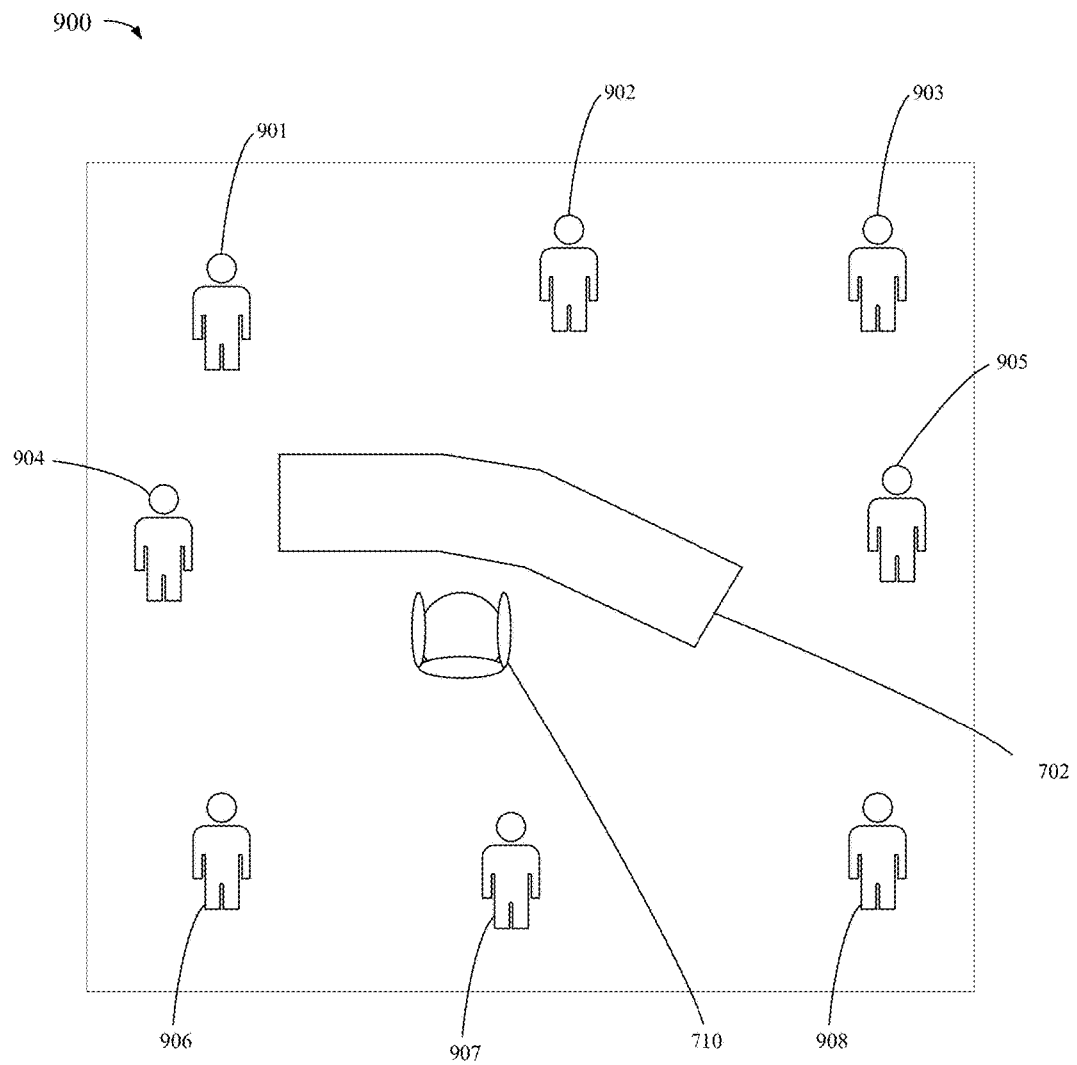
FIG. 9 depicts a room layout identifying multiple locations for capturing images of real world objects to determine a 3D model of the real world objects for providing a user experience.

FIG. 9 depicts a room layout identifying multiple locations for capturing images of real world objects to determine a 3D model of the real world objects for providing a user experience. In this example, a user is prompted to capture images of real world objects, such as desk 702 or chair 710 by moving around the real world environment 900 to capture images of those objects from various perspectives. For example, a device may prompt the user to move around to particular locations, such as locations 901-908 or to move around while viewing the object using a camera device until a predetermined number of different perspectives of the object are captured by the camera. For example, a message can instruct the user to walk around an object viewing a particular object until a green light switches to a red light in and HMD display. The system can then monitor the different images of the object that are captured until a sufficient number and variety of images are captured to generate or find a 3D model of the object or otherwise identify the object. Once each object has been captured from a sufficient number of perspectives, the device can prompt the user to capture images of an additional object or conclude the real world object selection process. In alternative embodiment, the user can additionally, rotate the objects themselves rather than moving around them to capture images of the objects from multiple perspectives. For example, the user could slowly spin the office chair around to capture images of the chair from different perspectives.

Exemplary Computing Environment

Figure 10:
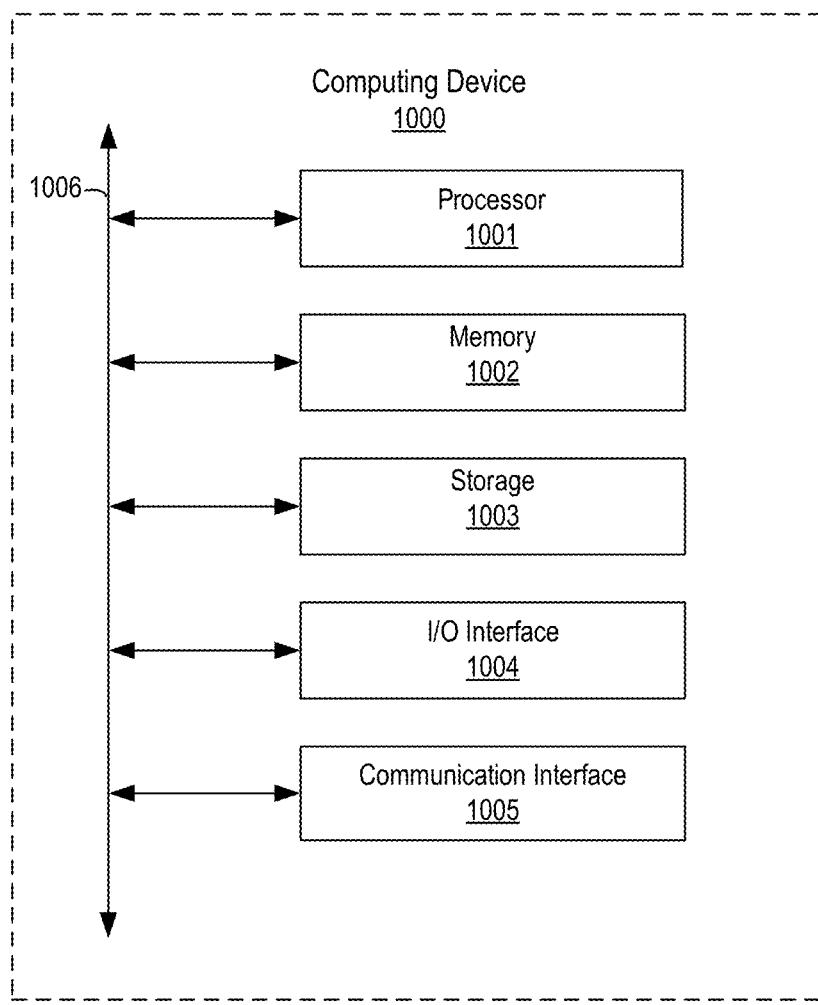
FIG. 10 is a block diagram depicting an example hardware implementation.

Any suitable computing system or group of computing systems can be used to implement the techniques and methods disclosed herein. For example, FIG. 10 is a block diagram depicting examples of implementations of such components. The computing device 100 can include a processor 101 that is communicatively coupled to a memory 102 and that executes computer-executable program code and/or accesses information stored in memory 102 or storage 103. The processor 101 may comprise a microprocessor, an application-specific integrated circuit ("ASIC"), a state machine, or other processing device. The processor 101 can include one processing device or more than one processing device. Such a processor can include or may be in communication with a computer-readable medium storing instructions that, when executed by the processor 101, cause the processor to perform the operations described herein.

The memory 102 and storage 103 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 100 may also comprise a number of external or internal devices such as input or output devices. For example, the computing device is shown with an input/output ("I/O") interface 104 that can receive input from input devices or provide output to output devices. A communication interface 105 may also be included in the computing device 100 and can include any device or group of devices suitable for establishing a wired or wireless data connection to one or more data networks. Non-limiting examples of the communication interface 105 include an Ethernet network adapter, a modem, and/or the like. The computing device 100 can transmit messages as electronic or optical signals via the communication interface 105. A bus 106 can also be included to communicatively couple one or more components of the computing device 100.

The computing device 100 can execute program code that configures the processor 101 to perform one or more of the operations described above. The program code can include one or more modules. The program code may be resident in the memory 102, storage 103, or any suitable computer-readable medium and may be executed by the processor 101 or any other suitable processor. In some embodiments, modules can be resident in the memory 102. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for providing a user experience with virtual reality content and user-selected, real world objects, the method comprising:
   providing a live selection view based on an optical see-through view of a real world environment directly through a semi-transparent mirror, the real world environment including real world objects;
   receiving input including a user motion that selects a subset of the real world objects in the live selection view, the subset of the real world objects selected for inclusion in the user experience;
   storing an object selection record comprising models of the real world objects in the selected subset;
   identifying, based on the input user motion, virtual reality content for inclusion in the user experience;
   providing the user experience by modifying a live view of the real world environment, wherein real world objects in the live view that correspond to models in the object selection record are visible and real world objects in the live view that do not correspond to models in the object selection record are modified or replaced with virtual reality content; and
   alternating, according to a user-specified schedule and based at least on the object selection record and virtual reality contents selected by the user and stored in a repository, among the virtual reality contents from different sources.

2. The method of claim 1, wherein providing the user experience comprises:
   capturing live video of the real world environment using a video camera on a head-mounted display (HMD);
   identifying the real world objects in individual frames of the live video that are in the subset;
   identifying other portions of the individual frames that do not include the real world objects that are in the subset;
   modifying the individual frames by replacing the other portions with the virtual reality content; and
   displaying the live video on a display of the HMD using the modified individual frames.

3. The method of claim 1, wherein receiving the input selecting the subset of the real world objects to be included in the user experience comprises receiving input including the user motion identifying boundaries around the real world objects of the subset, and wherein receiving the input including the user motion identifying the boundaries comprises:
   recognizing a finger of a user pointing in the real world environment in a space in front of the computing device;
   recognizing a movement of the finger in the space in front of the computing device tracing a path surrounding a 3D object in the real world environment during the live selection view;
   determining, based on the path, that the 3D object is selected; and
   augmenting the live selection view by combining the optical see-through view directly through the semi-transparent mirror with computer-generated content on the semi-transparent mirror indicating that the 3D object is selected.

4. The method of claim 1 further comprising:
   determining a three dimensional (3D) model of the real world environment, the 3D model comprising 3D attributes of the real world objects; and
   providing the user experience based on identifying real world objects of the subset in the live view of the real world environment using the 3D attributes of the real world objects.

5. The method of claim 4, wherein determining the 3D model of the real world environment comprises:
   capturing images of the real world environment from different viewing directions and using the images to determine the 3D model;
   instructing a user to move to different locations in the real world environment while viewing a respective object to capture the images of the real world environment from different viewing directions using a head-mounted display on the user; and
   monitoring the images of the respective object to determine that a sufficient number of images are captured to generate the 3D model.

6. The method of claim 4:
   wherein providing the user experience further comprises using the 3D model to detect the subset of the real world objects corresponding to object selections that should not be replaced in a frame of the live view; and
   wherein using the 3D model to detect the subset of the real world objects further comprises identifying, via image detection, whether any of the real world objects match characteristics of a respective object of the subset of the real world objects.

7. The method of claim 1 further comprising receiving input specifying that a real world object will be included in the user experience based on an event, wherein, prior to detecting the event during the user experience, the real world object is replaced with the virtual reality content and, upon detection of the event, the real world object is made visible.

8. The method of claim 1, wherein the user motion comprises rotating a camera associated with the computing device, and wherein the computing device uses information about the rotation of the camera to identify that an object is a selected object in the selected subset of the real world objects.

9. The method of claim 1, further comprising:
   embedding a tracking code into the virtual reality content;
   sending a message including the tracking code to a personalization and marketing engine; and
   providing a suggestion to a user regarding the user experience based on the tracking code and an object selection of the user.

10. The method of claim 1, further comprising:
    establishing a connection between a user and a remote second user;
    merging the user experience with a second experience of the remote second user; and
    simulating, in the merged user experience, a face-to-face interaction with the remote second user, wherein the merged user experience includes at least a part of the subset of the real world objects.

11. The method of claim 1, further comprising modifying, pausing, or terminating the user experience in response to a rule triggered by a real-world event, wherein the rule is specified by a user or created by the computing device.

12. The method of claim 1, further comprising:
    in response to the computing device moving more than a threshold amount, detecting at least one of the real world objects; and in response to the computing device not moving more than the threshold amount, delaying detection of the real world objects.

13. The method of claim 1, further comprising:

detecting, via a sensor, that the computing device has not been moved; and identifying a respective object of the subset of the real world objects based on a previous position of the respective object in the live view and a comparison of an appearance of the respective object in the live view over time.

14. The method of claim 1, further comprising:

determining that a biometric condition satisfies a criterion indicating that a user is under stress; and altering the virtual reality content to help the user respond to the stress.

15. A computing device comprising:

a means for providing a live selection view based on an optical see-through view of real world objects in a real world environment directly through a semi-transparent mirror for inclusion in a user experience based on user input;

a means for receiving input, including a user motion, the input selecting a subset of the real world objects in the live selection view, the subset of the real world objects selected for inclusion in the user experience;

a means for storing an object selection record comprising models of the real world objects in the selected subset;

a means for identifying, based on the input, virtual reality content for inclusion in the user experience;

a means for providing the user experience that combines the real world objects with the virtual reality content and modifies a live view of the real world environment, wherein real world objects in the live view that correspond to models in the object selection record are visible and real world objects in the live view that do not correspond to models in the object selection record are modified or replaced with virtual reality content; and a means for alternating, according to a user-specified schedule and based at least on the object selection record and virtual reality contents selected by the user and stored in a repository, among the virtual reality contents from different sources.

16. The computing device of claim 15:

wherein the input selects the subset of the real world objects to be included in the user experience by identifying boundaries around the real world objects of the subset;

wherein the means for receiving the input including the user motion identifying the boundaries recognizes a finger of a user pointing in the real world environment in a space in front of the computing device;

wherein the user motion includes a movement of the finger tracing a path surrounding one or more 3D objects; and wherein the means for providing the user experience combines the optical see-through view directly through the semi-transparent mirror with computer-generated content on the semi-transparent mirror.

17. A non-transitory computer-readable medium storing instructions, the instructions comprising instructions for:

providing a live selection view based on an optical see-through view directly through a semi-transparent mirror of a subset of real world objects in a real world environment for inclusion in a user experience based on input;

receiving input including a user motion selecting a subset of the real world objects in the live selection view, the subset of the real world objects selected for inclusion in the user experience;

storing an object selection record comprising models of the real world objects in the selected subset;

identifying, based on the input, virtual reality content for inclusion in the user experience;

providing the user experience by modifying a live view of the real world environment, wherein real world objects in the live view that correspond to models in the object selection record are visible and real world objects in the live view that do not correspond to models in the object selection record are modified or replaced with virtual reality content; and alternating, according to a user-specified schedule and based at least on the object selection record and virtual reality contents selected by the user and stored in a repository, among the virtual reality contents from different sources.

18. The non-transitory computer-readable medium of claim 17:

wherein identifying the subset of real world objects to be included in the user experience comprises receiving input identifying boundaries around the real world objects of the subset;

wherein receiving the input comprises recognizing a finger of a user pointing in the real world environment in a space in front of a computing device associated with the non-transitory computer-readable medium;

wherein the user motion includes a user finger movement tracing a path surrounding one or more 3D objects; and providing the user experience further comprises combining the optical see-through view directly through the semi-transparent mirror with computer-generated content on the semi-transparent mirror.

\* \* \* \* \*